United States Patent [19]

Kiernan et al.

[11] 4,328,824
[45] May 11, 1982

[54] FLOW DIVIDER WITH PLURAL METERING GEARS, UNRESTRAINED SPACERS THERE-BETWEEN AND LUBRICATED END ROLLER BEARINGS

[75] Inventors: James G. Kiernan, Albany, N.Y.; James G. Leonard, Hendersonville, N.C.

[73] Assignee: General Electric Company, Schenectady, N.Y.

[21] Appl. No.: 101,532

[22] Filed: Dec. 10, 1979

[51] Int. Cl.³ .................... G05D 11/03; F01C 11/00
[52] U.S. Cl. ............................... 137/99; 418/2; 418/95; 418/200; 418/213
[58] Field of Search .................. 418/2, 95, 131, 200, 418/212, 213; 137/99; 222/330; 91/532

[56] References Cited

U.S. PATENT DOCUMENTS

| | | | |
|---|---|---|---|
| 616,662 | 12/1898 | Goehring | 418/131 |
| 796,724 | 8/1905 | Hewitt | 418/200 |
| 1,737,942 | 12/1929 | Pagel | 418/95 |
| 2,246,277 | 6/1941 | Davidson | 418/95 |
| 2,291,578 | 7/1942 | Johnson | 418/200 |
| 2,343,912 | 3/1944 | Lauck | 91/532 |
| 3,495,610 | 2/1970 | Van Aken, Jr. | 91/532 |
| 3,500,961 | 3/1970 | Eberhardt et al. | 184/31 |
| 3,589,843 | 6/1971 | Zalis | 418/202 |
| 3,601,139 | 8/1971 | Kontranowski | 137/99 |
| 3,716,787 | 2/1973 | Hammond | 73/518 |

FOREIGN PATENT DOCUMENTS

| | | | |
|---|---|---|---|
| 138627 | 3/1921 | United Kingdom | 418/200 |
| 609108 | 9/1948 | United Kingdom | 418/200 |
| 845800 | 8/1960 | United Kingdom | 418/200 |

*Primary Examiner*—John J. Vrablik
*Attorney, Agent, or Firm*—Jerome C. Squillaro

[57] ABSTRACT

A flow divider is described for accurately dividing and metering the flow of a common fluid, such as fuel oil, to a plurality of fluid outlets. The flow divider includes a plurality of metering gear sets rigidly fixed on two parallel common continuous shafts, with each of the gear sets separated from adjacent gear sets by separater spacers also fixed on the shafts but free to move in a common radial cavity formed by a split housing enclosing the shafts and gears. The two parallel common continuous shafts are supported at each end by roller bearings which are separated from the gear sets by means of a seal and are lubricated by a separate source of lubricant. The roller bearings on one end of the parallel shafts are fixed in an axial location relative to the shafts and the roller bearings on the other end of the common shafts are free to move axially without experiencing binding or seizing of the shafts or roller bearings.

7 Claims, 21 Drawing Figures

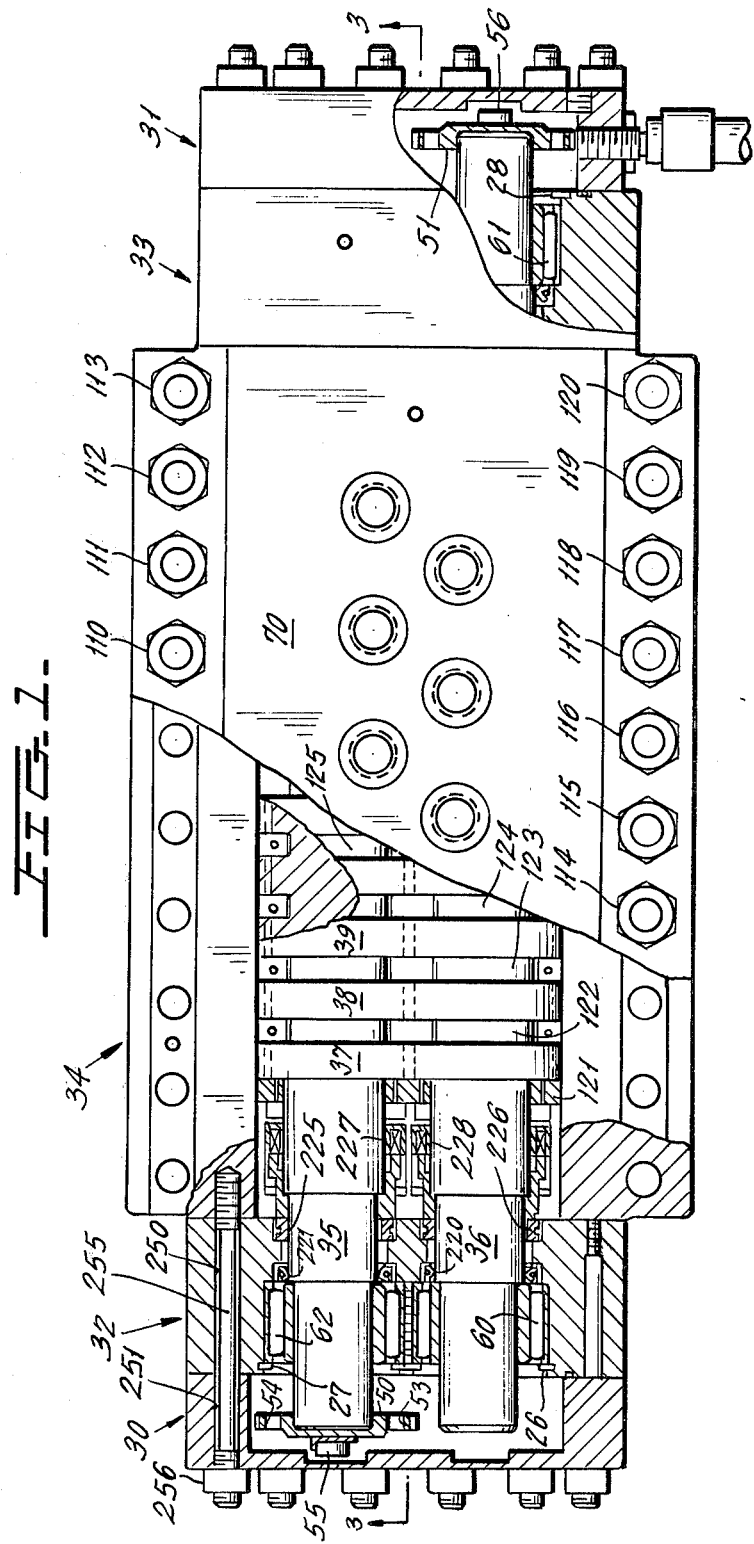

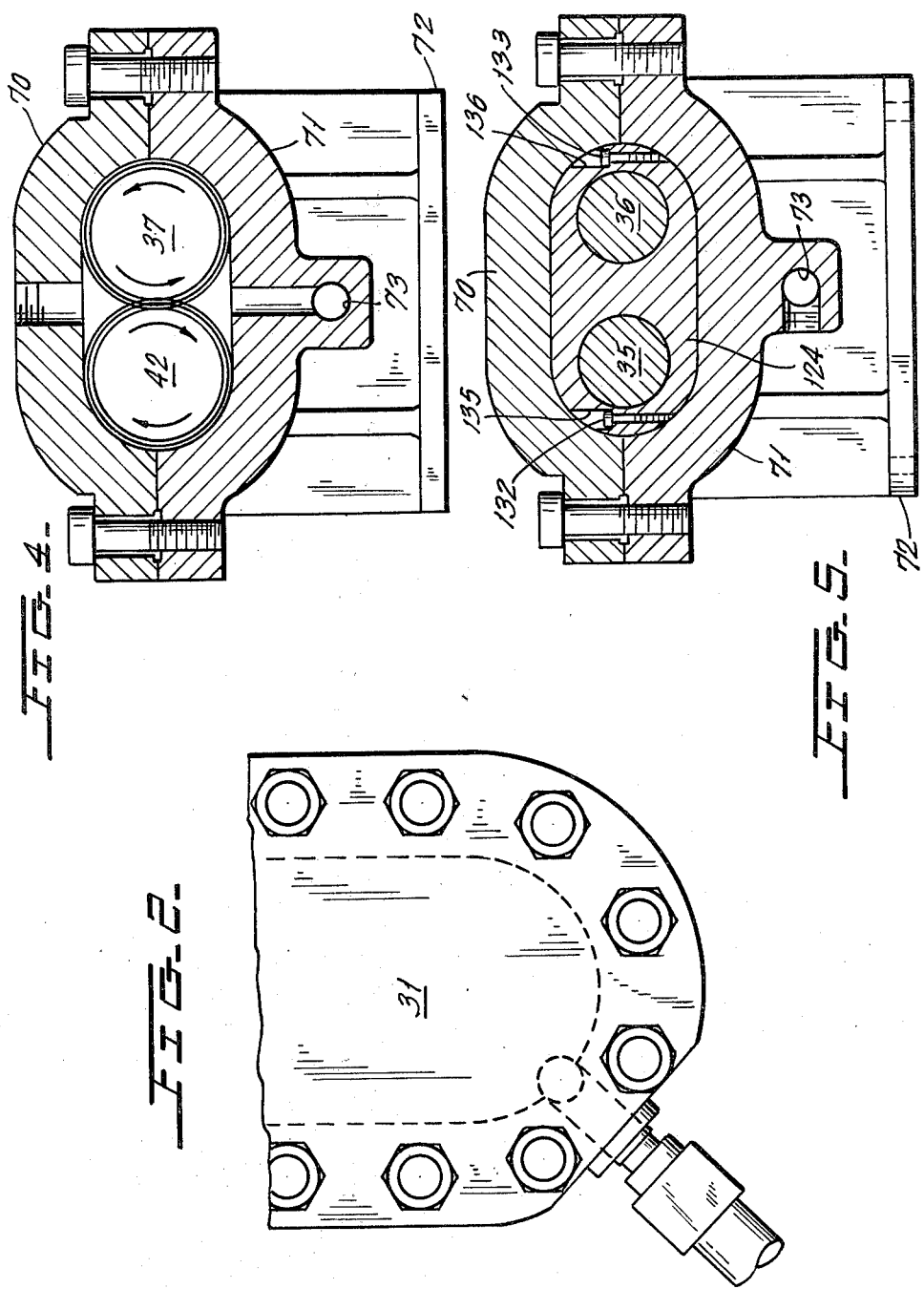

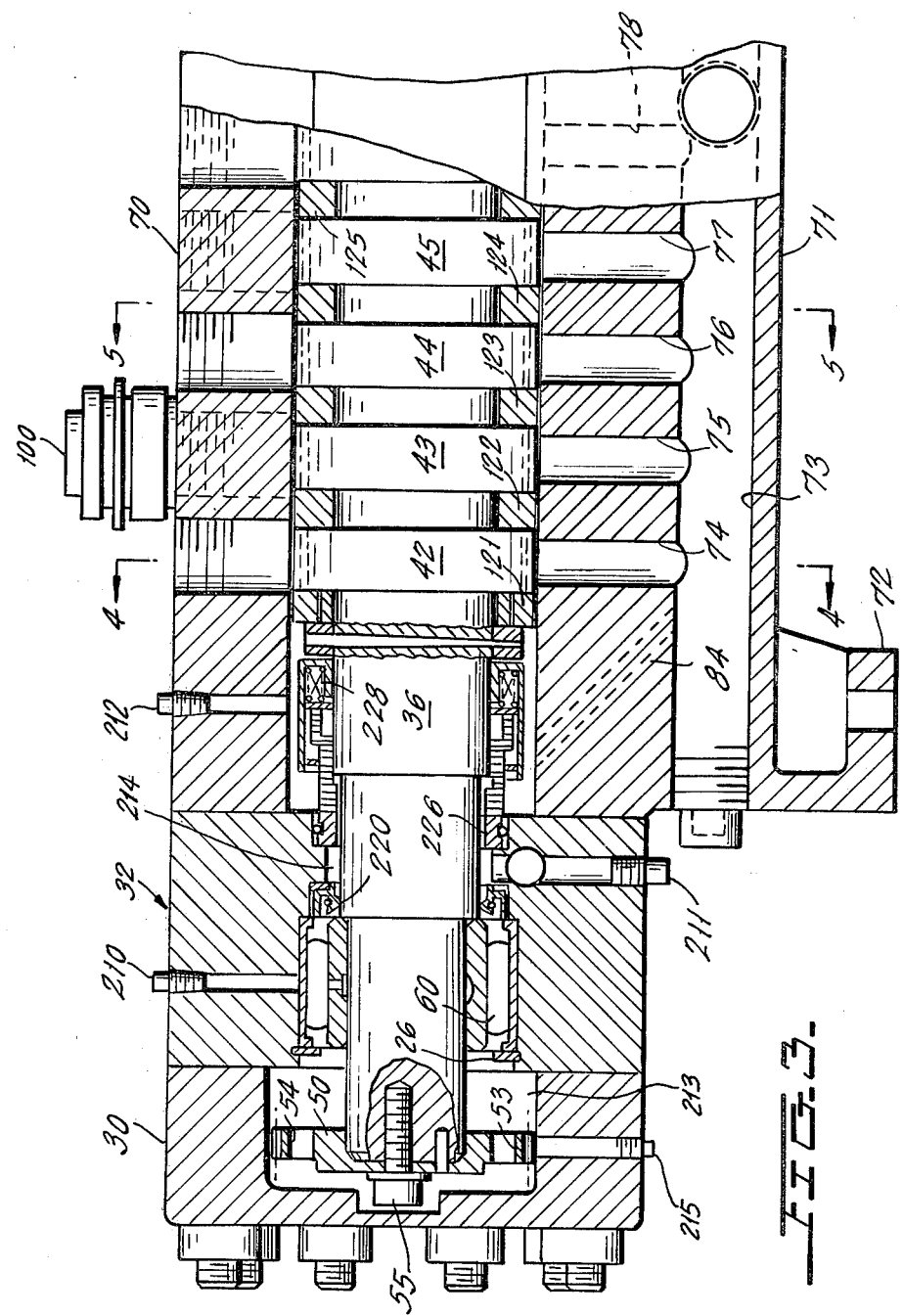

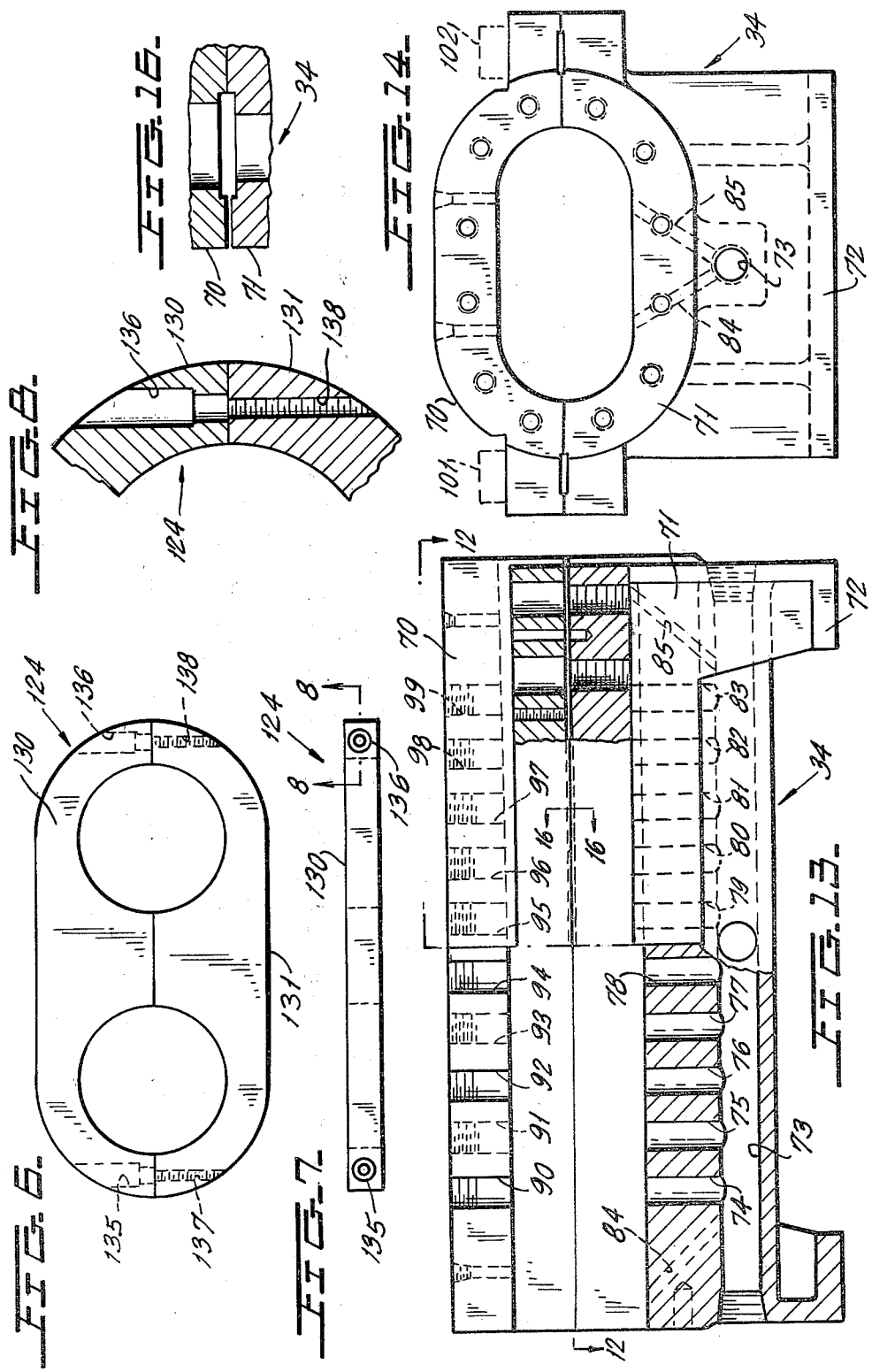

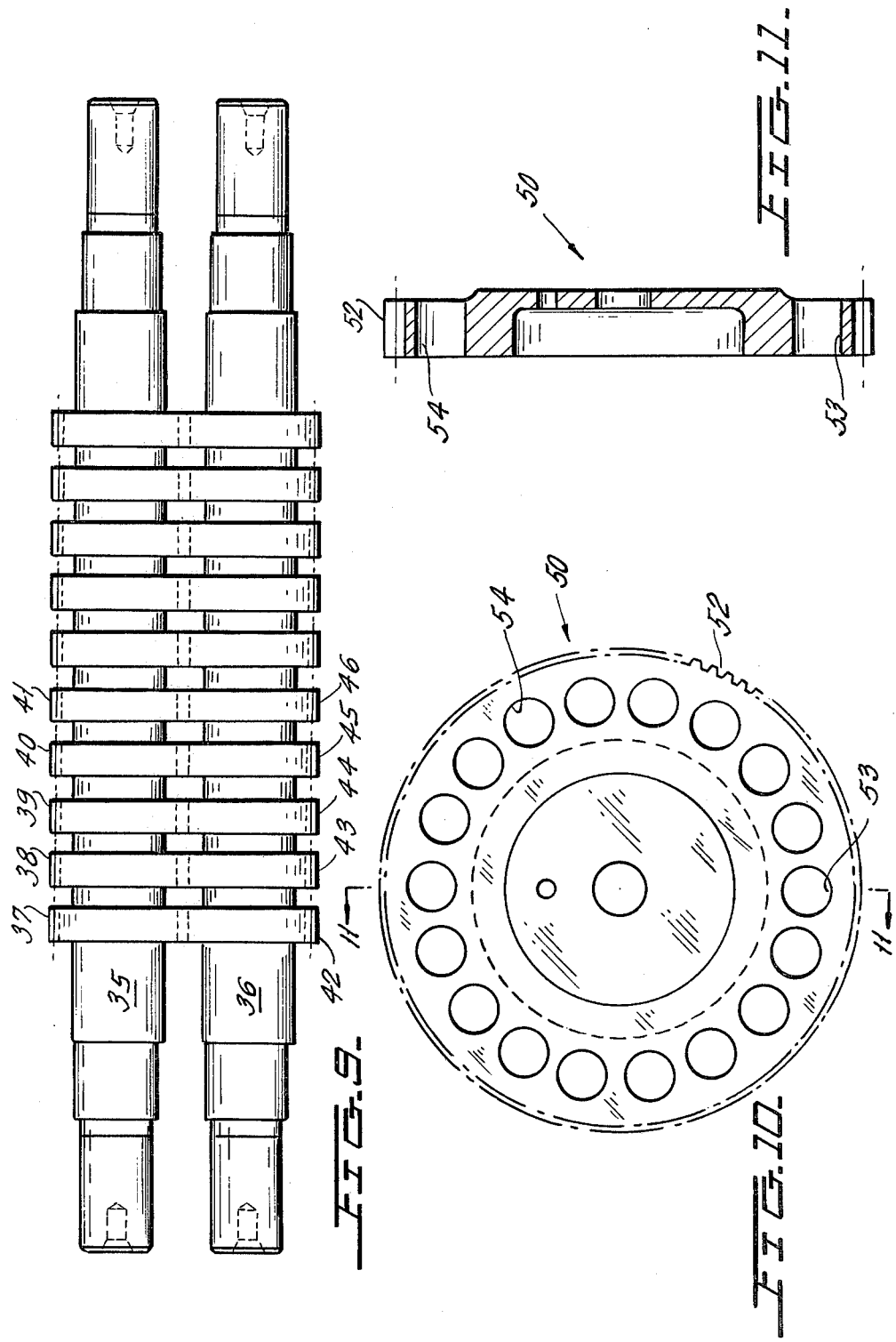

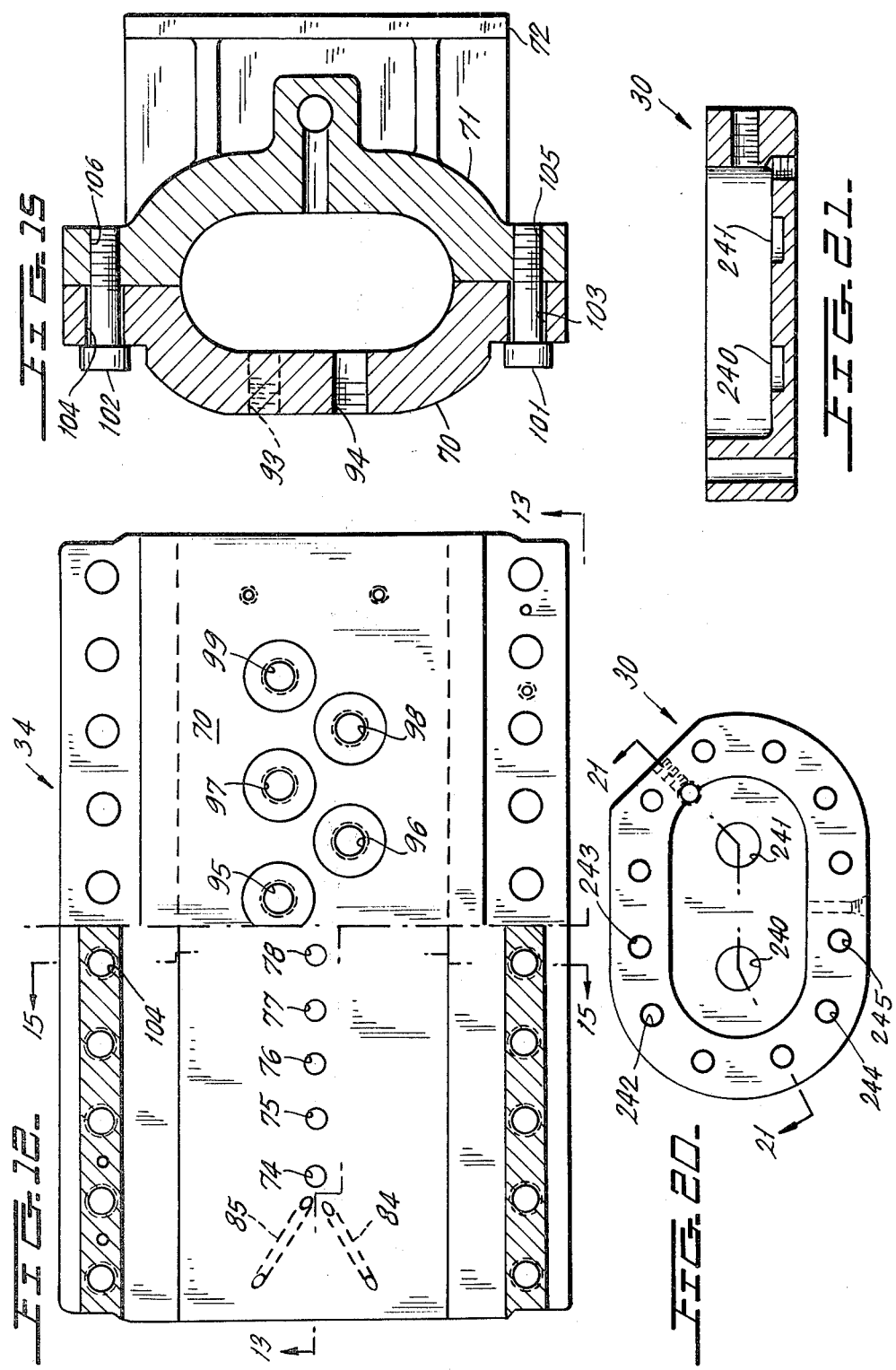

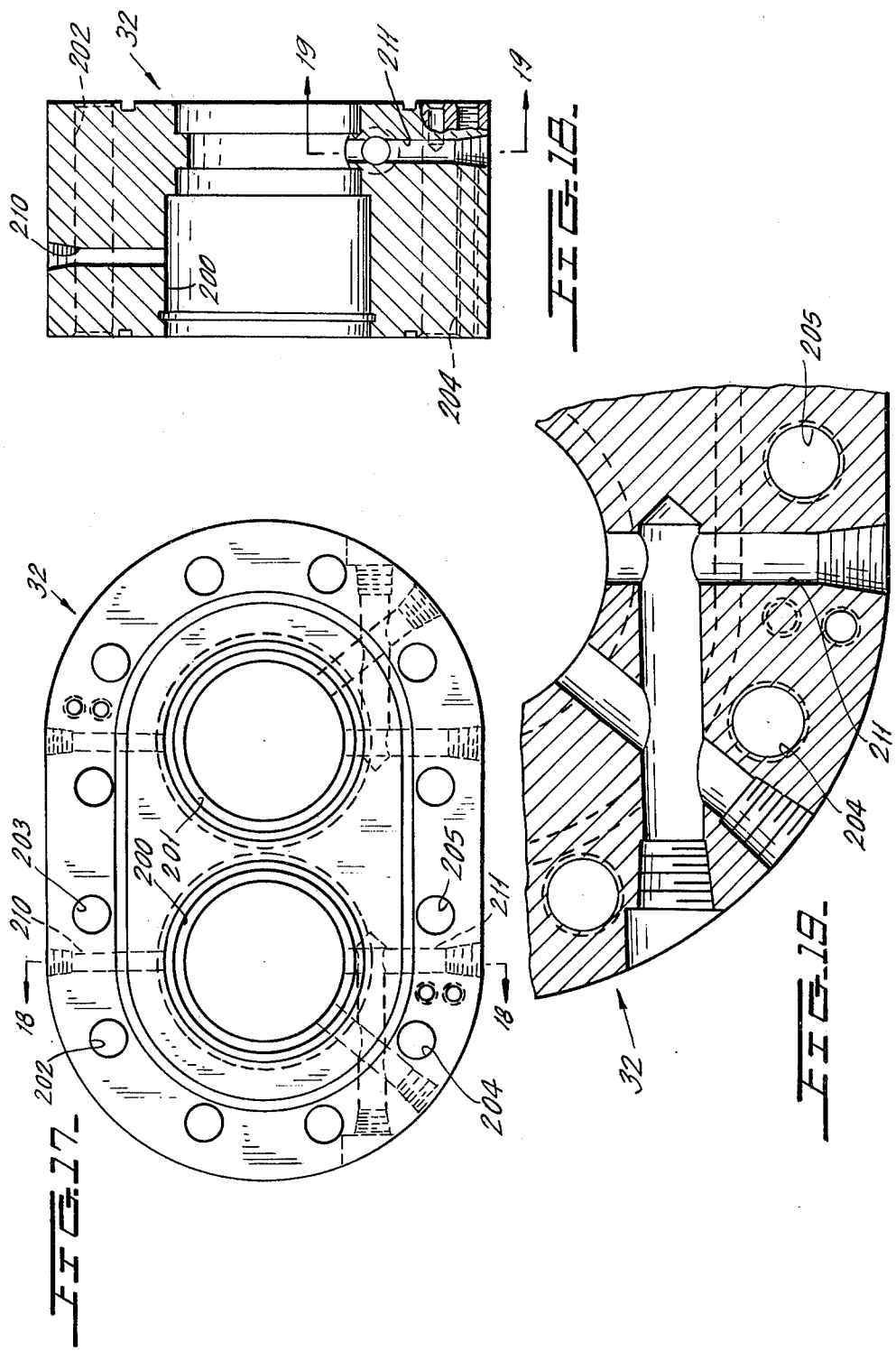

FLOW DIVIDER WITH PLURAL METERING GEARS, UNRESTRAINED SPACERS THERE-BETWEEN AND LUBRICATED END ROLLER BEARINGS

BACKGROUND OF THE INVENTION

This invention relates to a flow divider, and more particularly relates to a novel flow divider for equalizing the distribution of fluid fuel to the nozzles of a plurality of combustion cans of a gas turbine arrangement.

Flow dividers for ensuring a continuous equal distribution of a fluid to several different outlets are well known. Conventionally, a plurality of spaced sets of metering gears is provided and a common inlet conduit is connected to each of the metering gear sets. The output fluid from each of the metering gear sets should then be always balanced regardless of the hydraulic impedance in any of the outlet channels. Configurations of this general type are shown, for example, in U.S. Pat. Nos. 2,291,578 to Johnson, 3,601,139 to Kontranowski, 3,495,610 to Van Aken, Jr., 2,343,912 to Lauck and 796,724 to Hewitt. Flow dividers of this general type are presently employed in gas turbines for distributing fuel oil between the different combustion can nozzles of the gas turbine.

The provision of equal quantities of fuel to the different combustion cans must be maintained under at least two critical conditions. The first is during turbine start-up when the flow divider must compensate for the differences in elevation between the combustion cans and to ensure that equal quantities of fuel go to each combustor chamber. The second condition is during normal operation when the different nozzles accumulate different thickness coke deposits. The flow dividers must continue to supply similar quantities of fuel to the various combustion chambers even though the back-pressure drops in the chambers vary due to unequal coking of the various fuel nozzles of the turbine.

The present fuel divider designs which are now in use in gas turbines use the fuel oil being divided as the lubricating fluid for the bearings of the metering gear shafts. This lubrication is satisfactory when using clean fuel oil. However, when running with certain crude oils and residuals, the metering shaft lubrication has been unsatisfactory and has caused excessive wear and failure of the bearings which were used. The bearings which were previously used consisted of numerous relatively small needle bearings; 20 needle bearings to 40 needle bearings in different designs which were used. The bearings which were used were also subject to corrosion but this problem can be solved substantially through the use of appropriate corrosion-resistant alloys.

The gas turbine flow dividers which are presently in use are also of a design which requires relatively complex assembly and disassembly when the device is to be inspected or maintained. Furthermore, entirely different structures and inventories of parts are required when machines are to have a different number of outlet chambers. Moreover, the designs which are presently used must be tailor-made for different shaft rotation speeds and the designs now used do not lend themselves to manufacturing standardization.

Finally, the designs presently in use are not tolerant of thermal excursions in the fluid being metered. When such excursions occur, the various components of the flow divider increase or decrease in length as the case may be to a degree that is proportional to the temperature rise of the individual part and its coefficient of thermal expansion. When such changes in length or size occur, the clearances provided frequently are closed down, and binding and seizing of the flow divider may occur. In gas turbine operation, such binding or seizing of the flow divider can result in the loss of fuel to the combustion system, and the consequent tripping out of the gas turbine from loss of flame. It should be noted that thermal transients are common in gas turbines operating on crude or residual fuels, as characteristically these fuels have to be heated to temperatures as high as 200° F. in order to achieve proper viscosity characteristics for combustion, and to ensure that all the wax particles in the fuel have been melted. At the same time, the gas turbines start up and shut down on distillate fuel, which is characteristically at a temperature of 50° F. It is during the transfer from the distillate fuel to the crude or residual fuel that the temperature transient on the order of 150° F. is experienced. This thermal transient takes place in a matter of a few seconds.

BRIEF DESCRIPTION OF THE PRESENT INVENTION

The novel fuel oil flow divider of the invention is particularly useful in connection with gas turbines, and is provided with parallel shafts carrying metering gear sets. Flow separation between the gear sets is achieved by sealing plates which ride in closely fitted grooves machined into the main shafts. The shafts are supported at their opposite ends by externally lubricated heavy-duty roller bearings. The lubrication system for the roller bearings is isolated from the fuel which is being metered by the flow dividing device. The lubricating oil used to lubricate the bearings of the metering gear shafts is preferably the lubricating oil from the turbine lube oil system.

The flow divider assembly is made in clam-shell or half-shell fashion so that the entire top of the assembly can be removed and the internal parts of the metering gear shafts assembled or disassembled. This novel feature permits great simplicity in assembly and disassembly and leads to an economical system which can be easily maintained.

As a further feature of the present invention, the flow divider is of a modular design. The individual gears are machined directly into a common shaft. The action of the gear hobbing process results in the direct alignment of each gear with respect to the other without the need for extensive indexing and keyway cutting operations which would be required if separate gears were assembled onto an individual gear shaft. The number of combustion cans to be served by the flow divider can readily be accommodated by increasing or decreasing the number of gears machined onto the shaft, as the case may be. In any event, the bearing housing, bearing assembly, and bearing cover plates remain the same. One outer casing assembly can accommodate a wide range of metering gear sets. Thus, the flow divider can be reasily adapted to handle turbines having any desired number of combustion cans. As a result, the inventory which must be kept on hand to make different flow dividers is substantially reduced as compared to arrangements which are custom-made for distributing flow to some predetermined number of combustion cans.

The novel design of the invention also employs larger diameter metering gears than used in previous flow dividers. Because of this, it is possible to use the design for a broad range of machines having significantly different fuel flows. Since a common design is applicable to a large number of machines having significantly different fuel flows, the design also incorporates a replaceable speed pickup gear which will have a diameter representative of the particular gas turbine model to which the fuel divider is applied. Thus, a large degree of standardization can be obtained with the novel arrangement of the invention.

Finally, the novel design of the invention incorporates the provisions for the flow divider to be able to withstand sudden thermal excursions in the temperature of the fluid being metered without experiencing binding or seizing. This feature has been achieved by the concept of the sealing plates which are held to the gear shafts by means of closely fitting grooves, while at the same time the outer perimeters of the seal plates are free to move axially with reference to the outer casing. Thus, during a thermal transient, if the gear shaft heats more rapidly than the casing, the gear shaft would grow. The individual sealing plates would move with the gear shafts free of any restraint imposed by the outer casing. Sufficient clearance has been provided at the bearing assemblies at the same end of each shaft to permit the shaft and bearing to slide axially in the bearing housing without experiencing any restraint. Thus, the design has been predicated upon the concept of being able to absorb thermal excursions without experiencing restraints. This is primarily the result of the novel concept of the use of the floating sealing plates for flow division used within the pressure containment casing.

BRIEF DESCRIPTION OF THE DRAWINGS

FIG. 1 is top view partly in section of the novel flow divider of the invention.

FIG. 2 is a partial end view of the end of the flow divider of FIG. 1.

FIG. 3 is a cross-sectional view of FIG. 1 taken across the section line 3—3 in FIG. 1.

FIG. 4 is a cross-sectional view of FIG. 3 taken across the section line 4—4 in FIG. 3.

FIG. 5 is a cross-sectional view of FIG. 3 taken across the section line 5—5 in FIG. 3.

FIG. 6 is a plan view of one of the spacers used in the stacked assembly of FIGS. 1, 3 and 5.

FIG. 7 is a top view of FIG. 6.

FIG. 8 is a partial cross-section of FIG. 7 taken across the section line 8—8 in FIG. 7.

FIG. 9 is a plan view of the gear shafts which carry the metering gear sets.

FIG. 10 is a plan view of the speed sensor gear which is shown in FIGS. 1 and 3.

FIG. 11 is a cross-sectional view of FIG. 10 taken across the section line 11—11 in FIG. 10.

FIG. 12 is a view partially in plan and partially in section of the gear housings of FIGS. 1 through 5. FIG. 12 is also a view taken across the section line 12—12 in FIG. 13.

FIG. 13 is a cross-sectional view of FIG. 12 taken across the section line 13—13 in FIG. 12.

FIG. 14 is a plan view of the right-hand end of FIG. 12.

FIG. 15 is a cross-sectional view of FIG. 12 taken across the section line 15—15 in FIG. 12.

FIG. 16 is a cross-section taken across the section line 16—16 in FIG. 13.

FIG. 17 is a plan view of the bearing housing which is used in the assembly of FIGS. 1, 2 and 3.

FIG. 18 is a cross-sectional view of FIG. 17 taken across the section line 18—18 in FIG. 17.

FIG. 19 is a cross-sectional view of FIG. 18 taken across the section line 19—19 in FIG. 18.

FIG. 20 is a plan view of the bearing housing cover plate.

FIG. 21 is a cross-sectional view of FIG. 20 taken across the section line 21—21 in FIG. 20.

DETAILED DESCRIPTION OF THE DRAWINGS

The novel assembly of the present invention is best shown in FIGS. 1 and 3. The construction of the individual components will be apparent from the other drawings.

Referring to FIGS. 1 and 3, the overall flow divider consists of several subassemblies. These include bearing housing cover plates 30 and 31 (FIGS. 20 and 21) which cover bearing housings 32 and 33, respectively (FIGS. 17 to 19) and a gear housing 34 (FIGS. 12 to 16). A pair of shafts 35 and 36 (FIG. 9) are rotatably mounted within the bearing housings 32 and 33 as will be later described, and carry cooperating sets of metering gears shown in FIG. 9 as gears 37 to 41 on shaft 35 and gears 42 to 46, respectively, on shaft 36. Note that any desired number of pairs of gears can be used depending upon the number of flow channels which are to receive a divided flow from a common input source. In the embodiment disclosed herein, ten pairs of metering gears are provided.

It should be noted that the gears which are provided including gears 37 through 46 in FIG. 9 are relatively large diameter gears and, therefore, can handle the metering of a wide range of flows of fluid by simply controlling the speed of rotation of the shafts 35 and 36. In order to take advantage of this novel flexibility, a pair of speed sensor gears 50 and 51 are fixed to shafts 35 and 36 at their opposite ends as shown in FIG. 1. The gear 50 is shown in detail in FIGS. 10 and 11 and includes an outer gear tooth pattern 52 and openings including openings 53 and 54 formed around its periphery. These then permit the use of any desired speed monitoring arrangement.

The flow divider system becomes a basic part of the gas turbine control system. The gas turbine control system senses gas turbine exhaust temperature, turbine speed, and actual fuel flow to the gas turbine combustion system. The actual fuel flow to the gas turbine combustion system is measured by sensing the speed at which the flow divider shaft rotates. Because of the high volumetric efficiency of the flow divider, the speed at which the flow divider gears and shafts rotate provides a direct correlation to actual fuel flow. Note that in FIG. 1 the metering gears 50 and 51 are fixed to the opposite ends of shafts 35 and 36 by the bolts 55 and 56, respectively. If the volume of fluid flowing through the flow divider is relatively low, the RPM of the flow divider shafts will be low. The speed sensing device used with the flow divider counts the number of teeth on the metering gear that pass within a given time period; in other words, it measures the velocity of the outer periphery of the metering gear surface. For a constant RPM, the velocity can be increased or decreased by increasing or decreasing the diameter of the metering gears 50 and 51, respectively. Thus, the relative sensitivity of the overall control system can be held constant by using large diameter metering gears for low flow of fuel, and smaller diameter metering gears for large flow of fuel.

The opposite ends of shafts 35 and 36, as pointed out above, are secured in four large heavy-duty roller bearings shown in FIG. 1 as the roller bearings 60 and 61 for the shaft 36 and roller bearing 62 and another not shown for the shaft 35. These bearings locate the shafts 35 and 36 within the split housing 34 which consists of an upper half 70 and a lower half 71 (FIGS. 13, 14 and 15) which define an oval cavity which receives the gears as is shown, for example, in FIGS. 14, 4 and 5. The location of the bearings 60, 61, 62, and the fourth not shown is achieved by snap rings 26, 27 and 28, respectively. At the left end of FIG. 1 where bearings 60 and 62 are shown, the bearings are tightly trapped in a fixed axial location by means of the snap rings 26 and 27, respectively. At the right end of FIG. 1 where bearing 61 and the fourth not shown are located, sufficient axial clearance is provided between the snap ring and the bearing to permit the shafts 35 and 36 to increase in length as the result of an abrupt 150° F. thermal transient without experiencing restraint. During the thermal transient, wherein the shaft would heat more rapidly than the casing and hence grow more rapidly than the casing, the bearing 61 and the fourth bearing not shown would be able to slide axially in the bearing housing 33 without being restrained by the presence of the snap ring.

The lower half 71 contains a support section 72 (FIGS. 13, 14 and 15) which enables the mounting of the flow divider. Also located in the lower half 71 is the main flow input conduit 73 to which the main fuel oil supply to be is connected. Conduit 73 leads to a plurality of individual channels located adjacent the pairs of metering gears including the channels 74 to 83. Conduit 73 also leads to channels 84 and 85 (FIGS. 13 and 14).

These channels permit some fuel oil to bypass the fluid metering channel formed by entrance passageway 74; metering gear set 37 and 42; sealing plates 121 and 122; and exit passageway 90. The bypassed fuel enters the cavity to the left of sealing plate 121. The flow passes over the mechanical face sealing arrangement 226 (FIG. 3) and is used to dissipate heat which may be generated at the contacting surface between parts 226 and 228 as a result of the rotation of the mechanical face seal 228 against its mating surface element 226. The flow from channels 84 and 85 after passing over the mechanical sealing arrangement as discussed above is then taken from the cavity by a tubing or piping connection 212 and returned to the suction side of the fuel pump that forwards fuel to the flow divider. The connection point for the piping or tubing conduit is delineated in FIG. 3 by the pipe plug connection shown immediately above part 228.

The upper housing half 70 contains outlet openings which are also located immediately above each set of metering gears including the outlet openings 90 through 99 which are alternately staggered to provide room for suitable connection devices such as the connection device 100 in FIG. 3.

The two halves 70 and 71 are then provided with flanges which can be bolted together after assembly of the entire device. For example, bolts such as bolts 101 and 102 pass through through-openings 103 and 104 in half 70 and thread into threaded openings 105 and 106, respectively, in the half 71 as shown in FIG. 15. A plurality of similar connection bolts are used as best shown by bolts 110 through 120 in FIG. 1. It will be understood that this novel clam-shell type arrangement will permit simplified assembly of the metering components.

In order to provide hydraulic isolation between the adjacent pairs of metering gear sets, a plurality of flow divider spacers are positioned on opposite sides of each set. These spacers are best shown in FIGS. 1, 3, 5, 6, 7 and 8. Thus, in FIGS. 1 and 3, there are shown spacers 121 through 125. Spacer 124 is shown in detail in FIGS. 5, 6, 7 and 8 and consists of the two halves 130 and 131 which are bolted together in a relatively sealed arrangement by the bolts 132 and 133. The bolts 132 and 133 extend through cooperating through-openings such as the through-openings 135 and 136 in half 130 and threaded openings 137 and 138 in half 131.

The provision of the spacers on opposite sides of each of the gear sets then defines a flow path from any of the inlet channels including channels 74 through 77 through the meshing metering gears of the cooperating gear set to their respective outlet opening.

It will be apparent that the split halves 70 and 71 of the housing permit very simple assembly and disassembly of the gear sets and spacers.

It should also be noted that the flow divider spacers or sealing plates 121-125 are free to slide axially in the flow divider housing 70-71. Thus, while the flow divider spacers or sealing plates 121-125 are axially positioned between individual sets of metering gears as the result of the close fitting grooves machined into the gear shafts and in which they ride, their outer perimeters are in no way axially positioned or restrained by the flow divider housing 70-71. As a result of this novel feature of the invention, the flow divider is able to withstand thermal transients without having the flow divider spacers or sealing plates 121-125 become bound up as the result of unequal rates of thermal growth between the gear shafts and the housings. Such unequal rates of growth would occur during a normal thermal transient.

The bearing housing 32 for housing bearings 60 and 62 is shown in detail in FIGS. 17, 18 and 19. The other bearing housing 33 will be identical. The housing 32 includes two central openings 200 and 201 which conventionally receive the bearings 60 and 62 of FIG. 1 and is further provided with a plurality of through-openings including through-openings 202, 203, 204 and 205 which enable connection of the bearing housings to the main gear housing as will be later described. Housing 32 contains the inlet port 210 which provides the lubrication for the roller bearing accommodated in central opening 200. The outer bearing race of the roller bearing has a hole in it which admits the lubricating oil directly into the bearing roller assembly. After flowing through the bearing rollers, the lubricating oil is dumped into the cavity 213 provided by the bearing housing cover plate part 30. This cavity 213 is clearly delineated in FIG. 3. Oil is then taken from this cavity 213 by means of a piping or tubing connection run and returned to the main turbine lube oil system. The connection point 215 for this piping or tubing connection run is located in FIG. 3 directly below part 53.

Within housing 32, a further cavity 214 is formed between parts 220 and 226. This annular cavity 214 is provided with several drain connections such as 211 shown in FIGS. 3 and 19. The purpose of this drain is to provide isolation of the fuel oil that is flowing through the flow divider from the turbine lubricating oil system that is employed for lubrication of the roller bearings. Thus, in the event that leakage occurs between parts 226 and 228, which provide the mechanical sealing arrangement between the rotating shaft 36 and the flow divider housing 70–71, the fuel oil flows to the annular cavity 214 and then is drained out of channel 211 by means of a pipe run to a suitable sump. The sump is at atmospheric pressure, and the sealing oil gasket part 220 isolates the lube oil system from the fuel oil that was contained in the annular drain cavity 214.

The bearings 60 and 62 are then contained within the housing 32 in a conventional manner and as noted above a wiper seal 220 is provided on the next larger shoulder of shaft 36. A similar wiper seal 221 is located on the next larger shoulder of shaft 35. The mechanical sealing consisting of parts 225 and 227 on shaft 35 and parts 226 and 228 on shaft 36 are provided in order to isolate the lubrication oil channels of oil which lubricates the bearings 60 and 62 from the fuel oil which enters the chambers containing the metering gears. Thus, as noted previously, the main shaft bearings, which are only four in number, are lubricated by lubrication oil best adapted for this purpose, rather than by the heavy fuel oil which is distributed and metered by the flow divider.

The bearing housings 32 and 33 are covered by bearing housing cover plates 30 and 31 which, as shown in FIGS. 20 and 21 (for the case of bearing housing 30), contain suitable depressions 240 and 241 which can accommodate the bolts 55 and 56 which mount the timing gears. Cover plates 30 and 31 are further provided with cooperating through-bolt openings including the through-bolt openings 242 through 245 which will be seen to correspond in position with the openings 202 through 205, respectively, in FIG. 17. Other similarly disposed through-openings are provided.

As shown in FIG. 1, the through-opening 250 in housing 32 is aligned with the similar through-opening 251 in the cover plate 30. A plurality of studs such as the stud 255 are then fitted through the aligned openings such as aligned openings 251 and 250 and are threaded into threaded openings in the opposite ends of the housing halves 70 and 71. A plurality of nuts, such as the nut 256 for the member 255, then fix the bearing housing 32 and its cover 30 to the split housing body 34. Thus, the novel assembly is held together in a novel modular or stacked arrangement whereby, regardless of the number of metering sets which are desired, the same bearings, bearing housings, bearing plates and spacers will be provided. Thus, if one wishes to make a unit employing a different number of gear sets, it is only necessary to provide a different number of gears on the gear shaft or to provide different shafts and housing halves. All of the other components will be identical in making units with different numbers of metering paths.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. In a flow divider for dividing the flow of a common fluid, the improvement comprising:

first and second continuous gear shafts, each shaft carrying a plurality of metering gears rigidly fixed to the shaft for rendering the metering gears immovable in the axial direction relative to the shaft, the metering gears on each shaft mating with corresponding gears on the other shaft and forming mating gear sets;

a main housing including a bore for enclosing said shafts and gears, said housing including first and second halves which close over said metering gears;

a plurality of spacers axially positioned between adjacent gear sets and free to move in the axial direction in the bore of said housing while being in fluid sealing arrangement with said shaft;

a common fluid input connected to said housing and adapted to supply said common fluid to said metering gears;

a plurality of fluid outlets connected to said housing and adapted to supply a metered amount of said common fluid from each of said metering gears;

first and second bearing housings abutting each end of said main housing, said bearing housings including respective roller bearings supporting each end of each said gear shafts, the bearings in said first housing being fixed in an axial location relative to said shafts and the bearings in said second housing being free to move axially therein; and means for lubricating each of said roller bearings, said means for lubricating being isolated from said common fluid being metered, whereby said flow divider is characterized by its ability to withstand sudden thermal excursions in temperature of the common fluid without experiencing binding or seizing of said gear shafts or said roller bearings.

2. The flow divider of claim 1 wherein the common metered fluid is fuel oil to be distributed to separate nozzles of a gas turbine.

3. The flow divider of claim 1 further comprising first and second bearing caps for enclosing the ends of said first and second bearing housings, respectively.

4. The flow divider of claim 1 further comprising a speed sensor gear means removably connected to an end of at least one of said gear shafts.

5. The flow divider of claim 1 further comprising respective snap rings for axially locating said bearings within said main housing body; zero clearance being provided between the ones of said bearings housed in said first bearing housing and the corresponding one of said snap rings, whereby said bearings housed in said first bearing housing are clamped in a given axial position; and sufficient axial clearance being provided between the ones of said bearings housed in said second bearing housing and the corresponding one of said second bearing housing and said corresponding one of said snap rings is prevented in the event of a sudden rise in the temperature.

6. The flow divider of claim 1 wherein said spacers are located in respective grooves in said gear shafts for providing said fluid sealing arrangement and for establishing the axial position of said spacers on said shafts.

7. The flow divider of claim 1 wherein the bore of the first and second halves of said main housing forms a close clearance common radial cavity with the tips of said gears, said radial cavity being separated into a plurality of smaller cavities by said plurality of spacers.

* * * * *